US012155317B2

(12) United States Patent
Alvi et al.

(10) Patent No.: US 12,155,317 B2
(45) Date of Patent: Nov. 26, 2024

(54) POWER INVERTER WITH ENHANCED CAPACITANCE

(71) Applicant: GM GLOBAL TECHNOLOGY OPERATIONS LLC, Detroit, MI (US)

(72) Inventors: Muhammad Hussain Alvi, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/866,995

(22) Filed: Jul. 18, 2022

(65) Prior Publication Data

US 2024/0022178 A1 Jan. 18, 2024

(51) Int. Cl.
*H02M 7/00* (2006.01)
*H02M 1/00* (2006.01)
*H02M 1/14* (2006.01)
*H02M 7/48* (2007.01)

(52) U.S. Cl.
CPC ......... *H02M 7/003* (2013.01); *H02M 1/0029* (2021.05); *H02M 1/14* (2013.01); *H02M 7/48* (2013.01)

(58) Field of Classification Search
CPC .......... H02M 7/003; H02M 7/48; H02M 1/14; H02M 1/0029
See application file for complete search history.

(56) References Cited

U.S. PATENT DOCUMENTS

2010/0277852 A1* 11/2010 Kimock ............... H01G 4/1272
361/311
2022/0360164 A1* 11/2022 Suzuki ................. H02M 1/123

FOREIGN PATENT DOCUMENTS

CN      111130361 A  *  5/2020  ............... H01B 5/02
JP      2013219919 A  *  10/2013

* cited by examiner

*Primary Examiner* — Jue Zhang
(74) *Attorney, Agent, or Firm* — CANTOR COLBURN LLP

(57) ABSTRACT

A power conversion device includes an inverter configured to receive direct current (DC) power and convert the DC power to alternating current (AC) power, at least one capacitor having a first capacitance, and a busbar assembly electrically connected to the inverter and configured to electrically connect the inverter to a power source. The busbar assembly includes a positive busbar and a negative busbar, and a first capacitor layer disposed between the positive busbar and the negative busbar. The first capacitor layer is configured provide an amount of capacitance in addition to the first capacitance.

20 Claims, 5 Drawing Sheets

POWER INVERTER WITH ENHANCED CAPACITANCE

INTRODUCTION

The subject disclosure relates to control of electric motors and/or other vehicle components, and more specifically, to power conversion.

Vehicles, including gasoline and diesel power vehicles, as well as electric and hybrid electric vehicles, feature battery storage for purposes such as powering electric motors, electronics and other vehicle subsystems. Power inverters are commonly used to convert direct current (DC) power from batteries to alternating current (AC) for use in, for example, driving electric motors. Power inverters include capacitors for limiting current and voltage and protecting electronic components. Such capacitors can experience stress due to voltage spikes and high frequency currents.

SUMMARY

In one exemplary embodiment, a power conversion device includes an inverter configured to receive direct current (DC) power and convert the DC power to alternating current (AC) power, at least one capacitor having a first capacitance, and a busbar assembly electrically connected to the inverter and configured to electrically connect the inverter to a power source. The busbar assembly includes a positive busbar and a negative busbar, and a first capacitor layer disposed between the positive busbar and the negative busbar. The first capacitor layer is configured provide an amount of capacitance in addition to the first capacitance.

In addition to one or more of the features described herein, the first capacitor layer includes a dielectric material having a high dielectric constant and a high dielectric strength, the high dielectric constant is selected to produce an electric field between the positive busbar and the negative busbar that corresponds to the additional capacitance, and the high dielectric strength is selected to withstand the electric field.

In addition to one or more of the features described herein, the high dielectric constant has a value of at least 10, and the high dielectric strength has a value of at least 20 kV/mm.

In addition to one or more of the features described herein, the busbar assembly includes a grounded enclosure that at least partially encloses the positive busbar and the negative busbar.

In addition to one or more of the features described herein, the enclosure includes a first enclosure layer and a second enclosure layer, and the positive busbar and the negative busbar are disposed between the first enclosure layer and the second enclosure layer.

In addition to one or more of the features described herein, the positive busbar is separated from the first enclosure layer by a first distance and the negative busbar is separated from the second enclosure layer by a second distance, the first distance and the second distance being less than one millimeter.

In addition to one or more of the features described herein, the busbar assembly includes at least one of a second capacitor layer disposed between the positive busbar and the first enclosure layer, and a third capacitor layer disposed between the negative busbar and the second enclosure layer.

In addition to one or more of the features described herein, the first capacitor layer is disposed between the positive busbar and the negative busbar.

In addition to one or more of the features described herein, the at least one capacitor includes a line-to-line capacitor and a pair of line-to-ground capacitors, the additional capacitance being in parallel to the pair of line-to-ground capacitors.

In addition to one or more of the features described herein, the first capacitor layer is configured to increase a slew rate and/or increase a switching speed of the conversion device.

In addition to one or more of the features described herein, the power conversion device is configured to be disposed in a vehicle, and the power source includes a vehicle battery system.

In another exemplary embodiment, a method of power conversion includes providing direct current (DC) power from a power source to a power conversion device. The power conversion device includes an inverter, at least one capacitor having a first capacitance, and a busbar assembly electrically connected to the inverter. The busbar assembly includes a positive busbar and a negative busbar, and a first capacitor layer disposed between the positive busbar and the negative busbar and configured to provide an additional capacitance. The method also includes converting the DC power to alternating current (AC) power, and reducing voltage ripple and supplying high frequency currents via the first capacitance and the additional capacitance provided by the first capacitor layer.

In addition to one or more of the features described herein, the first capacitor layer includes a dielectric material having a high dielectric constant and a high dielectric strength, the high dielectric constant is selected to produce an electric field between the positive busbar and the negative busbar that corresponds to the additional capacitance, and the high dielectric strength is selected to withstand the electric field.

In addition to one or more of the features described herein, the additional capacitance is provided to supply high frequency currents due to operation of switching assemblies of the inverter.

In addition to one or more of the features described herein, the busbar assembly includes a grounded enclosure that at least partially encloses the positive bus and the negative bus, the enclosure includes a first enclosure layer and a second enclosure layer, the positive busbar and the negative busbars are disposed between the first enclosure layer and the second enclosure layer.

In addition to one or more of the features described herein, the busbar assembly includes at least one of a second capacitor layer disposed between the positive busbar and the first enclosure layer, and a third capacitor layer disposed between the negative busbar and the second enclosure layer.

In yet another exemplary embodiment, a vehicle system includes a memory having computer readable instructions and a processing device for executing the computer readable instructions. The computer readable instructions control the processing device to perform a method that includes providing direct current (DC) power from a power source to a power conversion device. The power conversion device includes an inverter, at least one capacitor having a first capacitance, and a busbar assembly electrically connected to the inverter. The busbar assembly includes a positive busbar and a negative busbar, and a first capacitor layer disposed between the positive busbar and the negative busbar and configured to provide an additional capacitance. The method also includes converting the DC power to alternating current (AC) power, and reducing voltage ripple and providing high frequency currents via the first capacitance and the additional capacitance provided by the first capacitor layer.

In addition to one or more of the features described herein, the first capacitor layer includes a dielectric material having a high dielectric constant and a high dielectric strength, the high dielectric constant is selected to produce an electric field between the positive busbar and the negative busbar that corresponds to the additional capacitance, and the high dielectric strength is selected to withstand the electric field.

In addition to one or more of the features described herein, the busbar assembly includes enclosure that at least partially encloses the positive bus and the negative bus, the enclosure includes a first enclosure layer and a second enclosure layer, the positive busbar and the negative busbars are disposed between the first enclosure layer and the second enclosure layer.

In addition to one or more of the features described herein, the busbar assembly includes at least one of a second capacitor layer disposed between the positive busbar and the first enclosure layer, and a third capacitor layer disposed between the negative busbar and the second enclosure layer.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
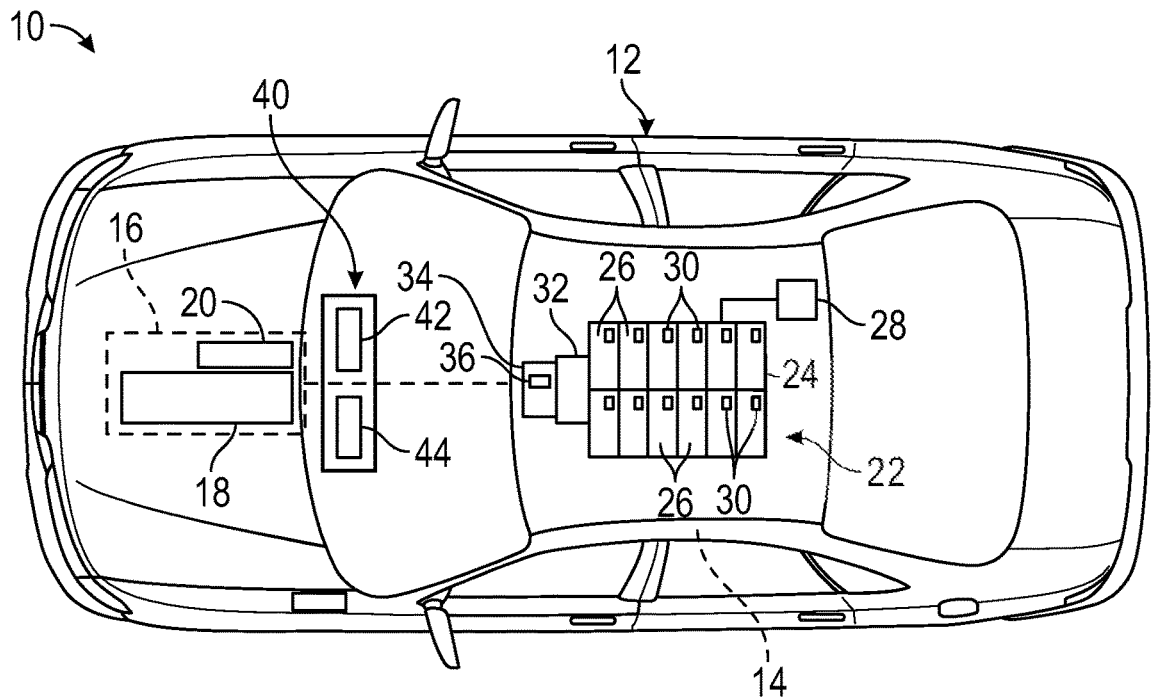
FIG. 1 is a top view of a motor vehicle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, methods, devices and systems are provided for power conversion. An embodiment of a power conversion device includes an inverter circuit (inverter), one or more capacitors and a busbar assembly for connecting the inverter and capacitor(s) to an energy source. For example, the conversion device is configured as, or incorporated into, an inverter module configured to supply power from a vehicle battery system to an electric motor and/or other electrical systems of a vehicle.

The busbar assembly includes a positive busbar and a negative busbar, which may be in planar configurations. The positive and negative busbars are separated by a capacitor layer that is configured to enhance parasitic capacitance and use the enhanced capacitance to supplement an existing capacitor or capacitors (e.g., X and Y capacitors as discussed further herein). The capacitor layer, in an embodiment, is made from a material (e.g., plastic and/or ceramic material) that has a high dielectric constant and a high dielectric strength, in order to generate and store electrical energy used for additional capacitance. One or more additional capacitor layers may be incorporated in the busbar assembly, such as additional capacitor layers disposed between the busbars and a grounded enclosure.

Typical isolation materials used to isolate busbars feature low dielectric constants in order to reduce electric fields. In contrast, embodiments described herein utilize high dielectric strength and high dielectric constant materials between busbars, which have been found to provide additional capacitance without significant detrimental effects.

Embodiments described herein present numerous advantages and technical effects. The embodiments provide for improved operation of conversion devices, such as power inverters in electric and/or hybrid vehicles. For example, high density inverters feature capacitors in order to help with voltage and current spikes, as well as high frequency currents, by providing a low inductance path for high frequency currents. An example of high frequency currents are current ripple between about 100 kHz to about 10 MHz, which may occur at switching speeds of about 2 kHz to about 20 kHz. The additional capacitance provided as described herein serves to enhance the capabilities of existing capacitors, as well as reduce thermal stress of the existing capacitors.

In addition, embodiments improve inversion devices by reducing the size needed for effective operation. Typical inverters rely on high clearances and use isolation materials that have high dielectric strength and low dielectric constants. In addition, enclosures in typical chassis grounded inverters have relatively large separation from busbars. Embodiments described herein permit for much smaller clearances, thereby reducing the required volume. In addition, embodiments may allow for smaller capacitors, thereby further reducing the required volume.

The embodiments are not limited to use with any specific vehicle and may be applicable to various contexts. For example, embodiments may be used with automobiles, trucks, aircraft, construction equipment, farm equipment, automated factory equipment and/or any other device or system for which additional thermal control may be desired to facilitate a device or system's existing thermal control capabilities or features.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine assembly 18 and at least one electric motor assembly. In this embodiment, the propulsion system 16 includes an electric motor 20, and may include one or more additional motors positioned at various locations.

The vehicle 10 includes a battery system 22, which may be electrically connected to the motor 20 and/or other components, such as vehicle electronics. The battery system 22 may be configured as a rechargeable energy storage system (RESS).

In an embodiment, the battery system 22 includes a battery assembly such as a high voltage battery pack 24 having a plurality of battery modules 26. Each of the battery modules 26 includes a number of individual cells (not shown). The battery system 22 may also include a monitoring unit 28 configured to receive measurements from sensors 30. Each sensor 30 may be an assembly or system having one or more sensors for measuring various battery and environmental parameters, such as temperature, current and voltages. The monitoring unit 28 includes components such as a processor, memory, an interface, a bus and/or other suitable components.

The battery system 22 is electrically connected to a DC-DC converter module 32 and an inverter module 34. The inverter module 34 (e.g., a traction power inverter unit or TPIM) converts direct current (DC) power from the battery assembly to three-phase alternating current (AC) power to drive the motors. In an embodiment, the inverter module 34 includes an inverter 36 connected to the DC-DC-converter module 34 for receiving DC power, and is connected to the motor 20 for providing three-phase AC power thereto.

The vehicle 10 also includes a computer system 40 that includes one or more processing devices 42 and a user interface 44. The various processing devices and units may communicate with one another via a communication device or system, such as a controller area network (CAN) or transmission control protocol (TCP) bus.

Figure 2:
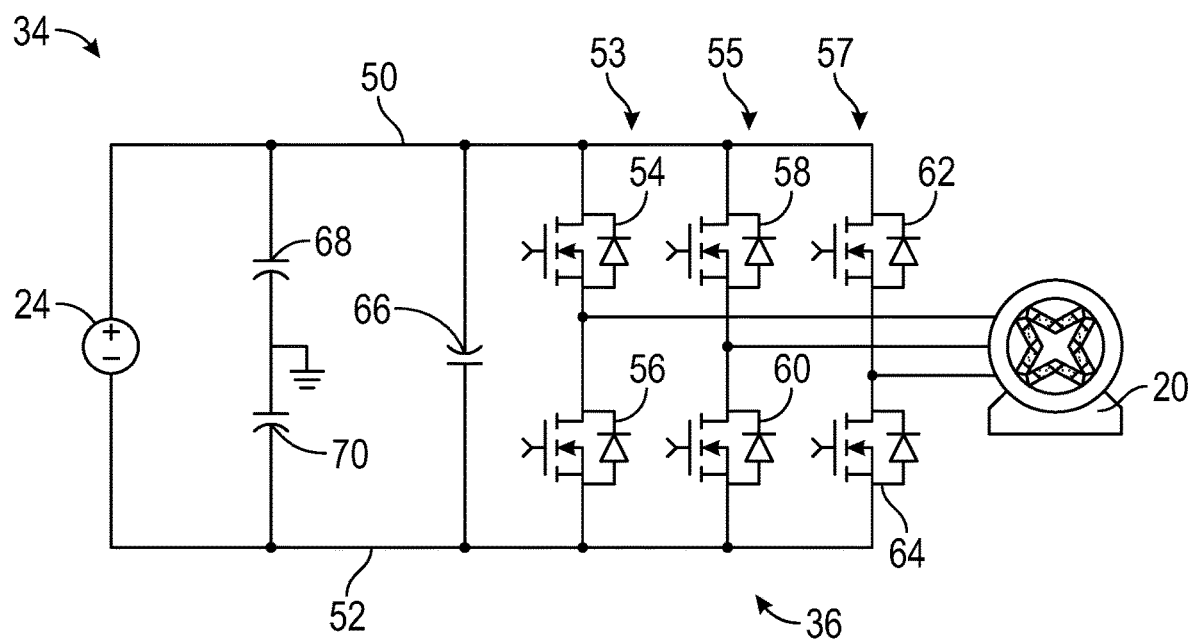
FIG. 2 schematically depicts components of a power conversion device, in accordance with an exemplary embodiment.

FIG. 2 schematically illustrates an embodiment of the inverter module 34 including a three-phase inverter circuit (inverter 36). The inverter module 34 may be incorporated into a vehicle, such as the vehicle 10.

The inverter 36 includes three sets of switches connected in parallel to a positive DC busbar 50 and a negative DC busbar 52. Each set of switches is in a half-bridge configuration. A first set of switches 54 and 56 is connected to a first motor phase (phase A), a second set of switches 58 and 60 connected to a second motor phase (phase B), and a third set of switches 62 and 64 is connected to a third motor phase (phase C). In an embodiment, the sets of switches are incorporated into one or more switching modules. For example, the first set of switches 54 and 56 is incorporated into a first switching module 53, the second set of switches 58 and 60 is incorporated into a second switching module 55, and the third set of switches 62 and 64 is incorporated into a third switching module 57.

Any suitable device may be employed as a switch. For example, the switches can include solid state relays and transistors such as Silicon (Si) insulated gate bipolar transistors (IGBTs), and field-effect transistors (FETs). Examples of FETs include metal-oxide-semiconductor FETs (MOSFETs), Si MOSFETs, silicon carbide (SiC) MOSFETs, gallium nitride (GaN) high electron mobility transistors (HEMTs), and SiC junction-gate FETs (JFETs). Other examples of switches that can be used include diamond, gallium oxide and other wide band gap (WBG) semiconductor-based power switch devices.

The inverter module 34 also includes various capacitors for stabilizing operation. In an embodiment, the inverter module 34 includes a bulk DC capacitor 66 (line-to-line capacitor), also referred to as a Class X capacitor or simply X capacitor (XCap). The X capacitor 66 is connected to the positive and negative buses in parallel to the sets of switches.

The inverter module 34 also includes two bypass capacitors 68 and 70 (line-to-ground capacitors), also referred to as Class Y capacitors or simply Y capacitors (YCap). The Y capacitor 68 and Y capacitor 70 are connected in parallel to the sets of switches and are connected to ground (e.g., to the module housing or chassis).

Figure 3:
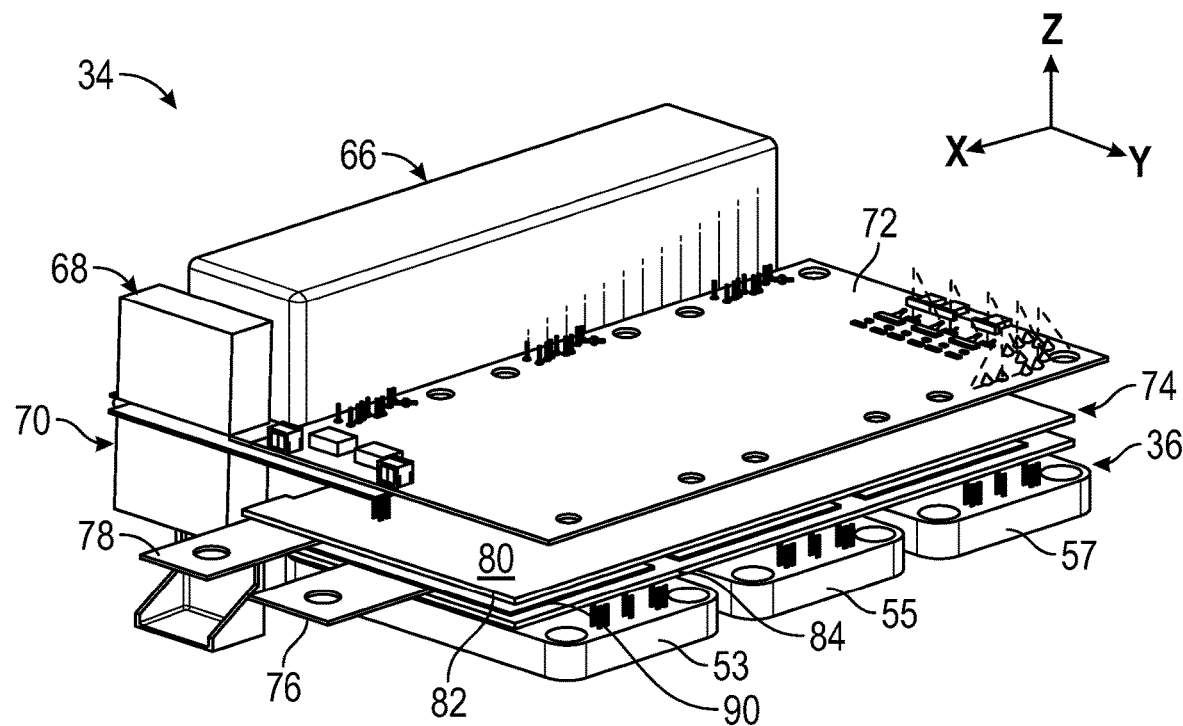
FIG. 3 is a front perspective view of a power conversion device configured as an inverter module and including at least one capacitor layer, in accordance with an exemplary embodiment.
Figure 4:
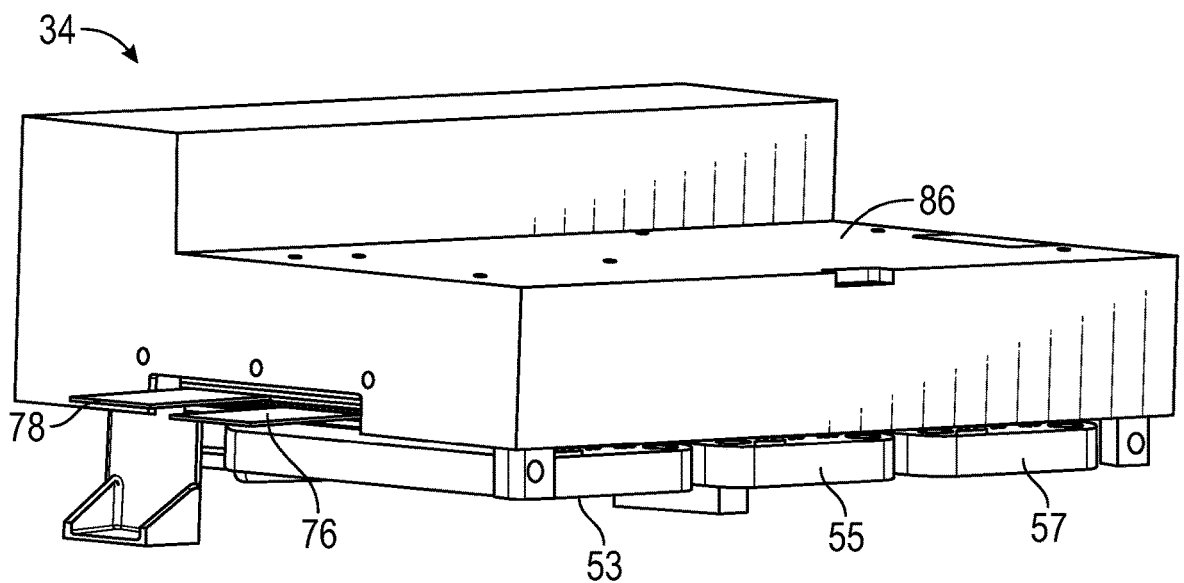
FIG. 4 is a front perspective view of the power conversion device of FIG. 3, showing a chassis enclosing components thereof.

FIGS. 3 and 4 show components of an embodiment of the inverter module 34 and shows relative positions of the capacitors 66, 68 and 70, as well as the switching modules 53, 55 and 57. The inverter module 34 is, for example a traction power inverter module (TPIM) used in electric and hybrid vehicles. FIG. 3 shows the inverter module 34 in a partially disassembled state so that internal components of the module 34 are visible. FIG. 4 shows the inverter module 34 with a chassis that houses the internal components.

The X capacitor 66 and the Y capacitors 68 and 70 are attached to a circuit board 72 that includes various wiring connections and may include or be configured as a control module. The capacitors 66, 68 and 70 and the switching modules 53, 55 and 57 are connected to a busbar assembly 74. The busbar assembly 74 includes the positive busbar 50, which includes a positive terminal 76. The negative busbar 52 includes a negative terminal 78. The terminals 76 and 78 are used for coupling to, for example, the DC-DC converter 32 or the battery pack 24.

The busbar assembly 74 also includes an enclosure 80 that houses or encloses the busbars 50 and 52, and is grounded to a chassis, housing or other suitable component. The enclosure 80 includes a first enclosure layer 82, and a second enclosure layer 84 that is grounded to a chassis 86 of the inverter module 34 (shown in FIG. 4). The second enclosure layer 84 (also referred to as a chassis ground layer) may be grounded to any suitable location or component.

As shown, the various layers are flat structures that each define a plane represented by axes x and y, as shown in FIG. 3. Each layer has a thickness in a direction perpendicular to the plane and represented by a z-axis. Each layer can have any suitable thickness (e.g., less than or equal to 2 mm).

The busbar assembly 74 includes one or more capacitor layers disposed between the first enclosure layer 82 and the second enclosure layer 84. Each capacitor layer is made from a material having a high dielectric strength and a high dielectric constant κ (i.e., relative permittivity), and introduces additional capacitance (busbar to ground capacitance). In the embodiment of FIGS. 3 and 4, the busbar assembly includes a capacitor layer 90 disposed between the positive and negative busbars.

Dielectric strength is related to the maximum voltage that a dielectric material can withstand before electrical breakdown, and dielectric constant or permittivity is related to energy storage capability. High dielectric constant (permittivity) leads to high electrical fields between the busbar assembly and ground, and the high dielectric strength protects the capacitor layer(s) from breaking down.

In an embodiment, a "high dielectric constant" refers to a constant of at least 4. For example, a high dielectric constant material has a constant value of 10 to 20.

In an embodiment, a "high dielectric strength" refers to a dielectric strength of at least 20 kV/mm. For example, a high dielectric strength material has a dielectric strength of 20 to 100 kV/mm.

The capacitor layer 90 (and any additional capacitor layers) enhances parasitic capacitance, which is used to increase the capacitance of the inverter module 34 and can reduce strain on the capacitor 66 and/or the capacitors 68 and 70. For example, the capacitor layer 90 is parallel to the Y capacitors 68 and 70, thereby reducing stress on the Y capacitors and providing a low impedance path for high frequency currents.

In an embodiment, the busbar assembly 74 is configured so that the negative busbar 52 is separated from the first enclosure layer 82 by a first clearance or distance in the z-axis direction. Likewise, the positive busbar 50 is separated from the second enclosure layer 84 by a second clearance or distance in the z-axis direction. The clearance or distance, in an embodiment, is less than or equal to one millimeter, although other distances may be selected as desired.

Figure 5:
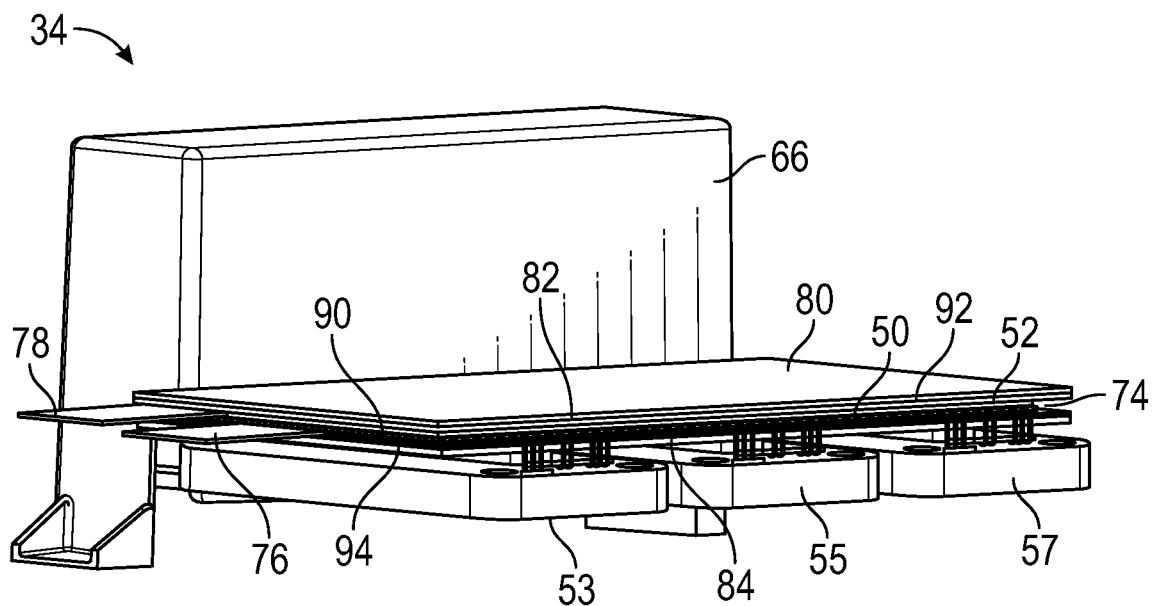
FIG. 5 is a front perspective view of a power conversion device configured as an inverter module and including multiple capacitor layers, in accordance with an exemplary embodiment.
Figure 6:
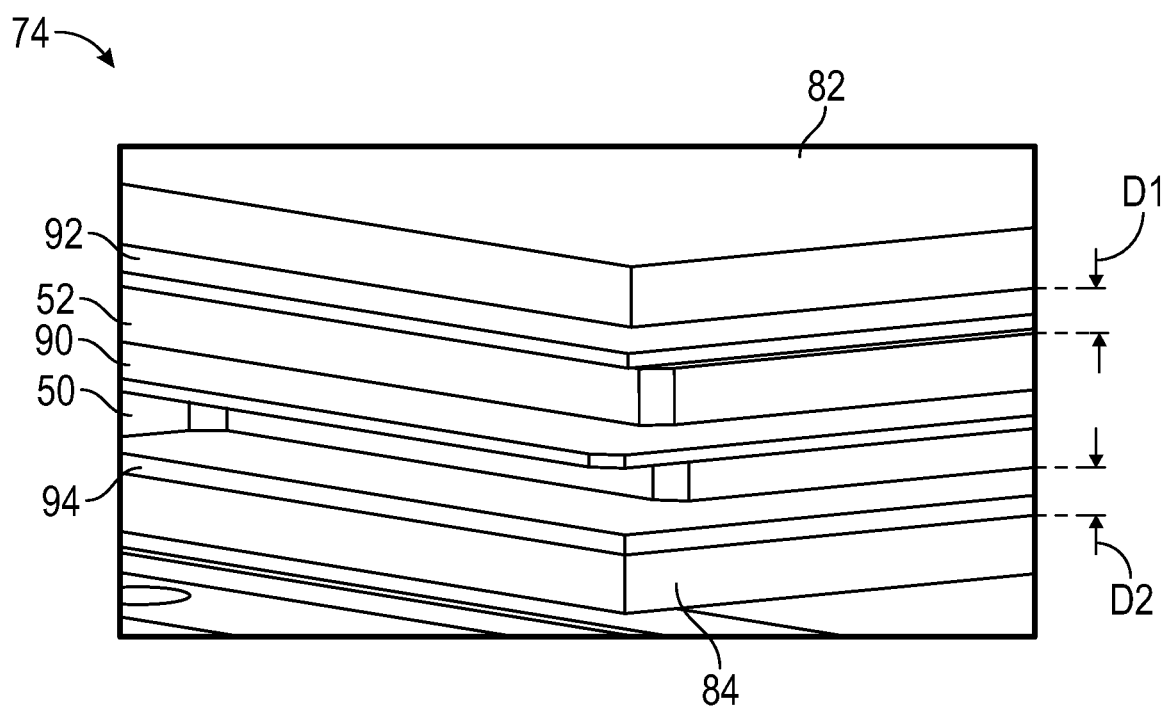
FIG. 6 is an expanded view of a portion of a busbar assembly of the power conversion device of FIG. 5.

As noted above, the busbar assembly 74 may include any desired number of capacitor layers. FIGS. 5 and 6 depict an embodiment of the inverter module 34, in which the busbar assembly includes the capacitor layer 90 and additional capacitor layers 92 and 94. The additional capacitor layers may have similar thicknesses and be made from similar materials as the capacitor layer 90.

As shown, the busbar assembly 74 includes a second capacitor layer 92 disposed between the first enclosure layer 82 and the negative busbar 52 (with no gaps therebetween). A third capacitor layer 94 is disposed between the second enclosure layer 84 and the positive busbar 50. The additional layers can further enhance the amount of capacitance.

FIG. 6 also shows an example of clearances, denoted as distances D1 and D2. In an embodiment, both distances are less than or equal to one millimeter. The distances D1 and D2 as shown are approximately the same, but may be different. As can be seen, the capacitor layers 92 and 94 provide for the desired clearance between the busbars and the enclosure 80.

Each capacitor layer may be made from a variety of materials and/or combinations of materials. Examples of such materials include plastics and ceramics that have high permittivity and dielectric strength. Materials having inherent permittivity characteristics can be used or combined with additive materials to increase permittivity and dielectric strength. For example, various paraelectric and ferroelectric materials can be mixed with resins or epoxies to form high dielectric strength and dielectric constant layers.

In an embodiment, the material(s) are conformable or compressible materials having a level of conformality and/or compression to allow for removal of air gaps during busbar assembly construction. In an embodiment, the material(s) have a dissipation factor (indicative of an increase in resistance as a function of current frequency) to provide for resistive damping.

Figure 7:
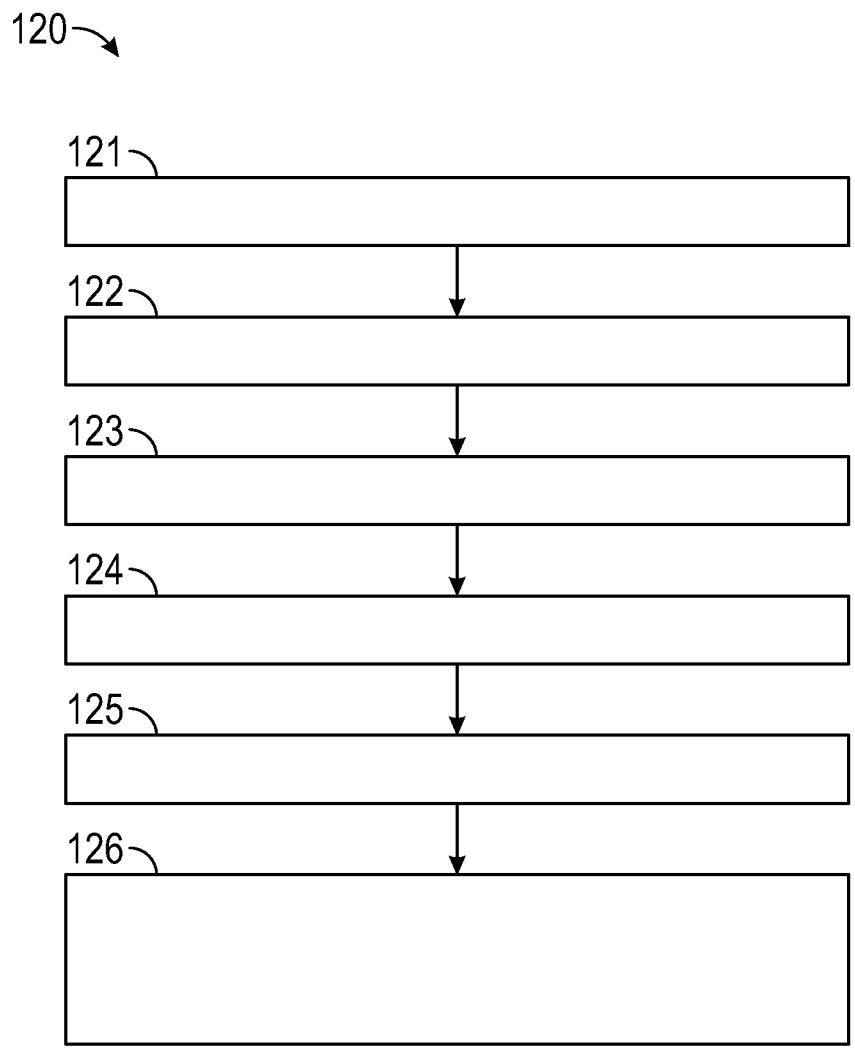
FIG. 7 is a flow diagram depicting aspects of a method of power conversion, in accordance with an exemplary embodiment.

FIG. 7 illustrates embodiments of a method 120 of power conversion. The method 120 may be performed in conjunction with a vehicle conversion device, such as the inverter module 34 of the inverter module. However, the method 120 is not so limited and may be used with any suitable conversion device having one or more capacitor layers as described herein. Aspects of the method 120 may be performed by a suitable processing device.

The method 120 includes a number of steps or stages represented by blocks 121-126. The method 120 is not limited to the number or order of steps therein, as some steps represented by blocks 121-126 may be performed in a different order than that described below, or fewer than all of the steps may be performed.

At block 121, a conversion device such as the inverter module 34 is constructed or manufactured using a suitable manufacturing process. The manufacturing process includes disposing at least one capacitor layer relative to inverter busbars. For example, during construction of the inverter module 34, the capacitor layer 90 is disposed between the positive and negative busbars and compressed. The capacitor layers 92 and 94 may be similarly compressed to ensure that no air gaps exist. Each capacitor layer may be attached to other layers in any suitable manner, such as via an adhesive or soldering. The capacitor layers may be separate layers inserted between the busbars and/or within the enclosure, or layers applied via deposition.

At block 122, the conversion device is installed in a vehicle, or installed in or otherwise connected to any other desired electrical system. For example, the inverter module 34 is installed in the vehicle 10.

At block 123, the conversion device is activated for converting DC power to AC power and supply the AC power to one or more electrical components. For example, the inverter module 34 is activated to supply power to the electric motor 20.

At block 124, the conversion device receives DC power from a power source such as the battery pack 24.

At block 125, a controller operates switches in the switching modules 53, 55 and 57, to generate AC phase currents. Switching may be controlled using a pulse width modulation technique. Each phase current is output, for example, to the motor 20.

At block 126, during operation, the capacitor layer or layers act to provide additional capacitance as described herein. The additional capacitance improves switching slew rates, which leads to improved efficiency. In addition, the capacitor layers provide the high frequency currents and dynamics to the inverter (e.g., inverter 36). The additional capacitance also allows for faster switching speeds or frequencies as compared to other conversion devices, without putting excessive stress on the switches. As an example, slew rates that are typically under about 8.5 A/ns can be improved to about 20 A/ns or more.

Figure 8:
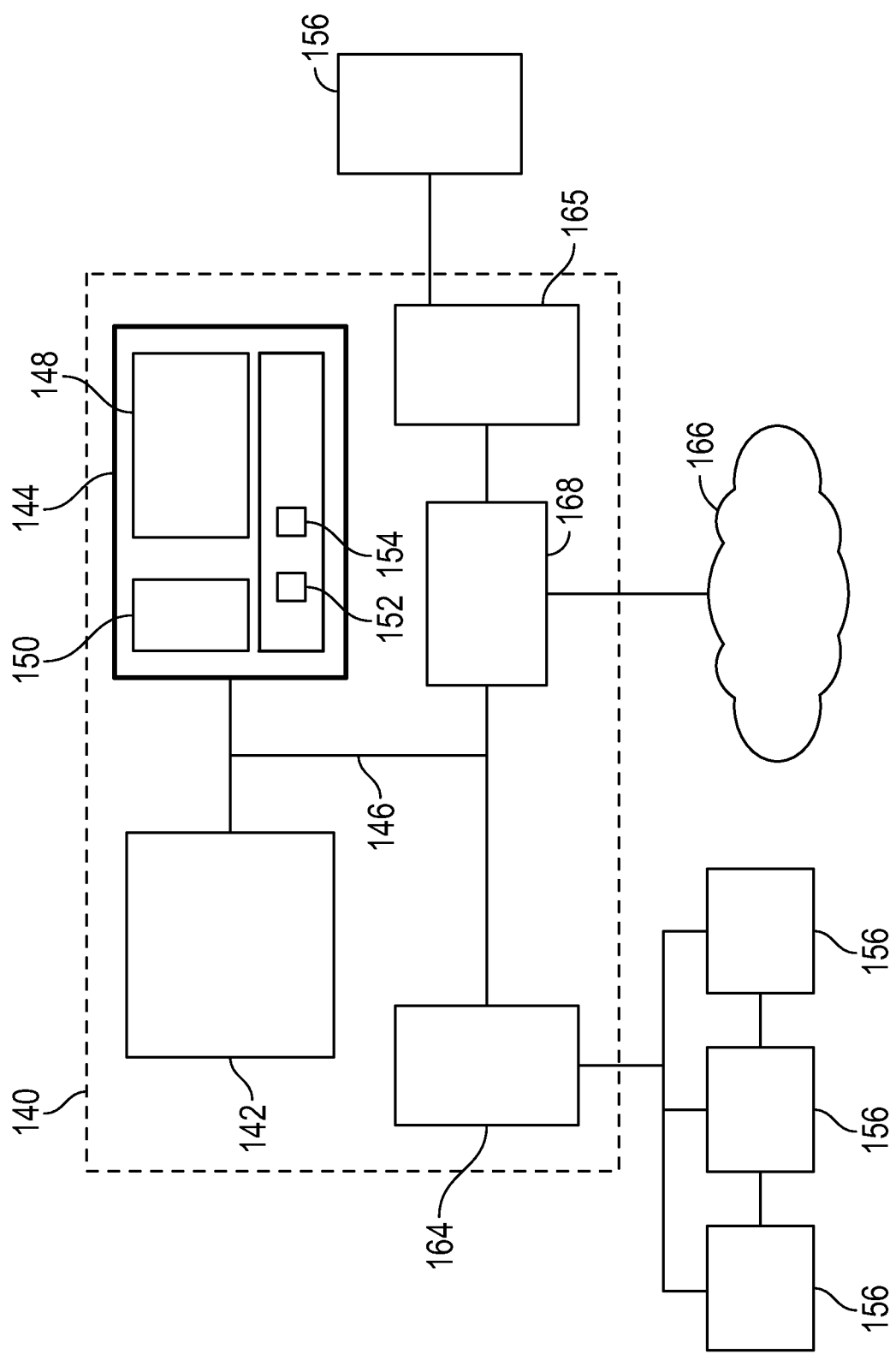
FIG. 8 depicts a computer system in accordance with an exemplary embodiment.

FIG. 8 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring system components, and a module 154 may be included to perform functions related to power control as discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A power conversion device, comprising:
an inverter configured to receive direct current (DC) power and convert the DC power to alternating current (AC) power;
at least one capacitor having a first capacitance, the at least one capacitor including a pair of line-to-ground capacitors connected in parallel to at least one set of switches of the inverter; and
a busbar assembly electrically connected to the inverter and configured to electrically connect the inverter to a power source, the busbar assembly including a positive busbar and a negative busbar, and a first capacitor layer disposed between the positive busbar and the negative busbar, the first capacitor layer configured to provide an amount of capacitance in addition to the first capacitance, the additional capacitance being in parallel to the pair of line-to-ground capacitors, the additional capacitance configured to reduce stress on the pair of line-to-ground capacitors, the first capacitor layer made from a compressible material, the first capacitor layer configured to be compressed between the positive busbar and the negative busbar to eliminate air gaps between the first capacitor layer and the positive busbar, and eliminate air gaps between the first capacitor layer and the negative busbar.

2. The device of claim 1, wherein the first capacitor layer includes a dielectric material having a high dielectric constant and a high dielectric strength, the high dielectric constant is selected to produce an electric field between the positive busbar and the negative busbar that corresponds to the additional capacitance, and the high dielectric strength is selected to withstand the electric field.

3. The device of claim 2, wherein the high dielectric constant has a value of at least 10, and the high dielectric strength has a value of at least 20 kV/mm.

4. The device of claim 1, wherein the busbar assembly includes a grounded enclosure that at least partially encloses the positive busbar and the negative busbar.

5. The device of claim 4, wherein the enclosure includes a first enclosure layer and a second enclosure layer, and the positive busbar and the negative busbar are disposed between the first enclosure layer and the second enclosure layer.

6. The device of claim 5, wherein the positive busbar is separated from the first enclosure layer by a first distance and the negative busbar is separated from the second enclosure layer by a second distance, the first distance and the second distance being less than one millimeter.

7. The device of claim 5, wherein the busbar assembly includes at least one of:
a second capacitor layer disposed between the positive busbar and the first enclosure layer; and
a third capacitor layer disposed between the negative busbar and the second enclosure layer.

8. The device of claim 7, wherein the first capacitor layer is disposed between the positive busbar and the negative busbar.

9. The device of claim 1, wherein the additional capacitance is configured to provide a low inductance path for high frequency currents.

10. The device of claim 1, wherein the pair of line-to-ground capacitors are physical capacitors that are distinct from the busbar assembly.

11. The device of claim 1, wherein the power conversion device is configured to be disposed in a vehicle, and the power source includes a vehicle battery system.

12. A method of power conversion, comprising:
providing direct current (DC) power from a power source to a power conversion device, the power conversion device including an inverter, at least one capacitor having a first capacitance, the at least one capacitor including a pair of line-to-ground capacitors connected in parallel to at least one set of switches of the inverter, and a busbar assembly electrically connected to the inverter, the busbar assembly including a positive busbar and a negative busbar, and a first capacitor layer disposed between the positive busbar and the negative busbar and configured to provide an additional capacitance, the additional capacitance being in parallel to the pair of line-to-ground capacitors, the additional capacitance configured to reduce stress on the pair of line-to-ground capacitors, the first capacitor layer made from a compressible material, the first capacitor layer configured to be compressed between the positive busbar and the negative busbar to eliminate air gaps between the first capacitor layer and the positive busbar, and eliminate air gaps between the first capacitor layer and the negative busbar;

converting the DC power to alternating current (AC) power; and reducing voltage ripple and supplying high frequency currents via the first capacitance and the additional capacitance provided by the first capacitor layer.

13. The method of claim 12, wherein the first capacitor layer includes a dielectric material having a high dielectric constant and a high dielectric strength, the high dielectric constant is selected to produce an electric field between the positive busbar and the negative busbar that corresponds to the additional capacitance, and the high dielectric strength is selected to withstand the electric field.

14. The method of claim 12, wherein the additional capacitance is provided to supply high frequency currents due to operation of switching assemblies of the inverter.

15. The method of claim 12, wherein the busbar assembly includes a grounded enclosure that at least partially encloses the positive bus and the negative bus, the enclosure includes a first enclosure layer and a second enclosure layer, the positive busbar and the negative busbars are disposed between the first enclosure layer and the second enclosure layer.

16. The method of claim 15, wherein the busbar assembly includes at least one of:

a second capacitor layer disposed between the positive busbar and the first enclosure layer; and a third capacitor layer disposed between the negative busbar and the second enclosure layer.

17. A vehicle system comprising:

a memory having computer readable instructions; and a processing device for executing the computer readable instructions, the computer readable instructions controlling the processing device to perform a method including:

providing direct current (DC) power from a power source to a power conversion device, the power conversion device including an inverter, at least one capacitor having a first capacitance, the at least one capacitor including a pair of line-to-ground capacitors connected in parallel to at least one set of switches of the inverter, and a busbar assembly electrically connected to the inverter, the busbar assembly including a positive busbar and a negative busbar, and a first capacitor layer disposed between the positive busbar and the negative busbar and configured to provide an additional capacitance, the additional capacitance being in parallel to the pair of line-to-ground capacitors, the additional capacitance configured to reduce stress on the pair of line-to-ground capacitors, the first capacitor layer made from a compressible material, the first capacitor layer configured to be compressed between the positive busbar and the negative busbar to eliminate air gaps between the first capacitor layer and the positive busbar, and eliminate air gaps between the first capacitor layer and the negative busbar;

converting the DC power to alternating current (AC) power; and reducing voltage ripple and providing high frequency currents via the first capacitance and the additional capacitance provided by the first capacitor layer.

18. The vehicle system of claim 17, wherein the first capacitor layer includes a dielectric material having a high dielectric constant and a high dielectric strength, the high dielectric constant is selected to produce an electric field between the positive busbar and the negative busbar that corresponds to the additional capacitance, and the high dielectric strength is selected to withstand the electric field.

19. The vehicle system of claim 17, wherein the busbar assembly includes enclosure that at least partially encloses the positive bus and the negative bus, the enclosure includes a first enclosure layer and a second enclosure layer, the positive busbar and the negative busbars are disposed between the first enclosure layer and the second enclosure layer.

20. The vehicle system of claim 19, wherein the busbar assembly includes at least one of:

a second capacitor layer disposed between the positive busbar and the first enclosure layer; and a third capacitor layer disposed between the negative busbar and the second enclosure layer.

* * * * *